United States Patent [19]

Todd

[11] 4,329,227
[45] May 11, 1982

[54] DEVICE FOR THE GASIFICATION OF LIQUIDS

[76] Inventor: John J. Todd, 11 Overbrook, West Horsley, Surrey, England

[21] Appl. No.: 125,132

[22] Filed: Feb. 27, 1980

[30] Foreign Application Priority Data

Dec. 13, 1979 [GB] United Kingdom ............... 7943005

[51] Int. Cl.³ ............................ B01F 3/04; C02F 1/74
[52] U.S. Cl. ................................ 210/220; 210/237; 261/77; 261/123; 261/124
[58] Field of Search ............... 210/220, 221 R, 237, 210/242 A; 261/77, 120, 121 R, 122–124, DIG. 75

[56] References Cited

U.S. PATENT DOCUMENTS

| | | | |
|---|---|---|---|
| 302,326 | 7/1884 | d'Heureuse | 261/120 |
| 2,448,157 | 8/1948 | Schneider | 210/237 X |
| 2,756,977 | 7/1956 | Temple | 210/220 X |
| 3,438,890 | 4/1969 | Neighbor | 210/220 X |
| 3,834,536 | 9/1974 | Kelsey | 210/220 X |
| 3,855,367 | 12/1974 | Webb | 261/120 X |
| 4,070,423 | 1/1978 | Pierce | 261/77 |
| 4,210,613 | 7/1980 | Webb | 210/220 X |
| 4,224,158 | 9/1980 | Molvar | 261/DIG. 75 |

FOREIGN PATENT DOCUMENTS 2398024 3/1979 France ............... 210/220

*Primary Examiner*—Robert H. Spitzer
*Attorney, Agent, or Firm*—Weingram & Klauber

[57] ABSTRACT

The device is a hollow annular member bounding a liquid flow passageway. The member has a gas inlet and a row of apertures around the throat of the passageway to emit gas bubbles into the liquid to induce an upward flow of gasified liquid. The base of the hollow is weighted and the device is freely suspended by a line in the liquid. The suspending line passes freely through a horizontal tube suspension point effectively rigid with the member and a substantial distance above the member. This improves stability of the device against bodily movements and oscillations due to flow reactions, and enables level placement of the suspended device in a desired location.

8 Claims, 4 Drawing Figures

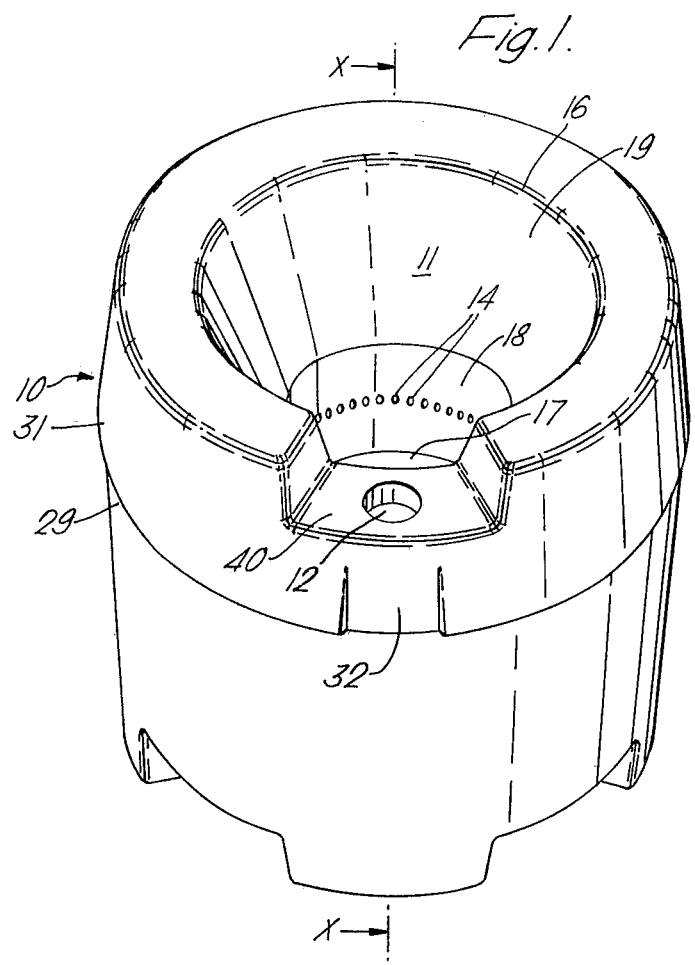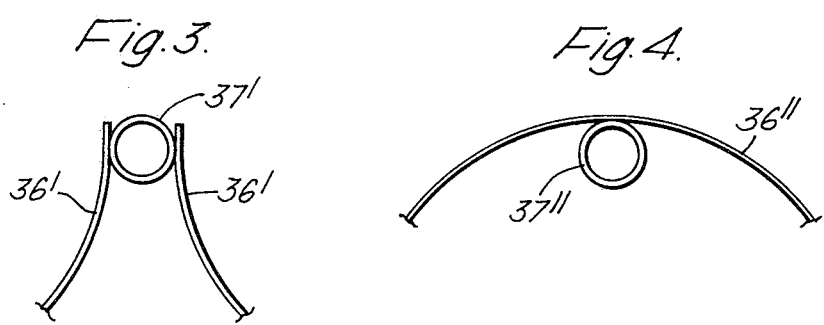

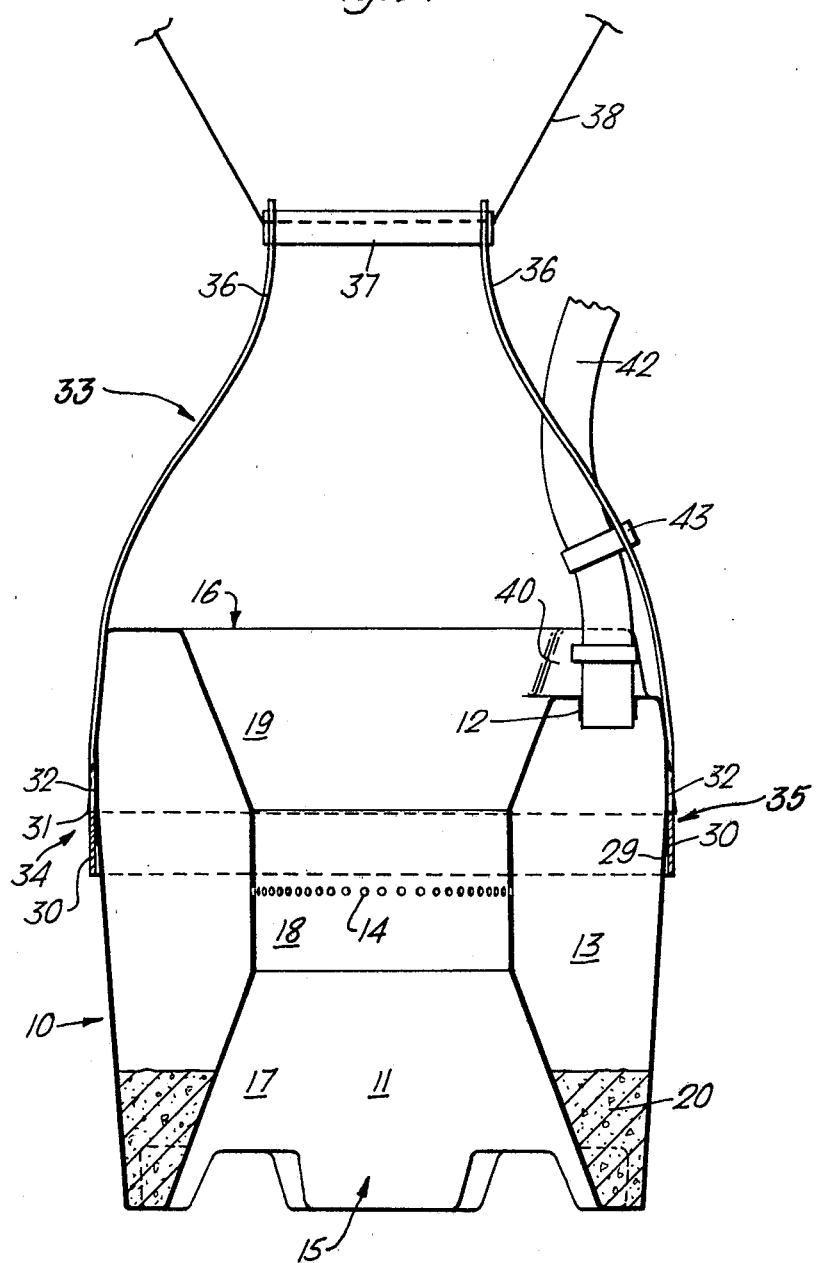

DEVICE FOR THE GASIFICATION OF LIQUIDS

BACKGROUND OF THE INVENTION

This invention relates to apparatus for the treatment of liquid media by gasification. One application of such apparatus is to the gasification of liquid media which contain organic matter degradable by the action of gases thereon, for example the aeration or oxygenation of sewage or other waste water.

British Pat. No. 1,482,191 discloses a device for the gasification of liquids which comprises a hollow ring member having a central liquid passageway and a gas inlet. A portion of the surface facing the passageway is apertured so that in operation the gas passes from the hollow into liquid in the passageway. The cross-section of the liquid passageway progressively increases away from the apertured area.

In operation that device is immersed in a liquid so that the liquid passageway has its longitudinal axis substantially vertical. The gas forms bubbles on passing through the apertures into the liquid in the passageway, the bubbles rising through the liquid to induce a flow of liquid upwardly through the passageway. The induced liquid flow passing the apertures exerts a shearing effect on the gas bubbles as they leave the ring member thereby producing smaller gas bubbles than in prior art devices and in consequence increasing the overall gas/liquid interface area for a given volume of gas, and thus increasing the rate of gas-to-liquid transfer.

Such devices have been found to be highly effective in practical use, particularly for aeration of waste water containing aerobically degradable organic matter, for example sewage. Such devices achieve a high rate of gas transfer into solution with low energy requirements and are also highly effective in setting up and maintaining a strong circulation pattern in the body of liquid being treated. This latter is of importance when the liquid medium includes a substantial proportion of suspended solids prone to settle out in a potentially anaerobic mass in any region of the medium not subject to a good circulation current.

Attention is further directed to my U.S. Patent Application Ser. No. 25460, now U.S. Pat. No. 4,198,359, of which is incorporated herein by reference, and which discloses various operating parameters that require consideration when constructing a waste water treatment plant and suspending such gasification devices therein, in particular certain dimensions and the positioning of the devices in relation to the treatment vessel for useful results.

British registered Design No. 987,313 shows a particular form of the device that has proved effective in practical use. A practical form is of plastics material about 40 centimeters tall and 40 centimeters in diameter, and in use is suspended by chains in a treatment vessel. The device is weighted, suitably by including concrete (e.g. 30 to 40 kilograms) introduced through the gas inlet to set in the lower portion of the hollow enclosure, to achieve an average density for the device in air greater than that of water and a reasonably low centre of gravity. In that form the device is suspended by individual chains directly shackled to diametrically opposite points of a steel belt surrounding the waist of the device.

Another form of device is disclosed in British Patent Application Ser. No. 7,901,809 which discloses "a device for the gasification of liquids which comprises a hollow annular member having a gas inlet into said hollow and an outer surface which bounds a central liquid flow passageway extending between a lower inlet and an upper outlet, the passageway comprising a lower convergent portion, an intermediate throat portion, and an upper divergent portion, said convergent portion having no apertures therein communicating with said hollow, said throat portion having a row of first apertures extending around a generally horizontal circumference thereof, and said divergent portion having a row of second apertures extending around a generally horizontal circumference thereof, said second apertures being no more than half the diameter of said first apertures". In one embodiment there may be a single row of first apertures of 6 millimeter diameter and a single row of second apertures of 3 millimeter diameter.

As stated above these devices can achieve a high rate of gas transfer and maintain a strong circulation pattern in the body of liquid. It is now found that the strength of each said pattern both in itself and in relation to the position of other devices present and the vessel walls exert considerable forces on the devices. Because the suspension is by chains any such forces which are not directly balanced by chain tension tend to cause various movements of the suspended device as well as fretting and tugging at the shackles. These movements can include bodily movements off station, bodily swinging movement and angular oscillations about each of three manually perpendicular axes. Under certain conditions some of these movements are susceptible to reinforcement by their own occurrence and this can lead to disruption of the desired circulation patterns and to devices becoming entangled or twisted in their suspension chains and thus out of their proper level.

It would be possible to some extent to increase the weight of each device to damp the oscillation but this would have the disadvantages of inconvenience in handling and to greater fretting forces on the suspension points without solving the basic problem. It would also be possible to provide a three or more chain suspension, but this would still be subject to fretting and instabilities and moreover it would be difficult and inconvenient to suspend the device level in itself and level with the other devices, particularly in virtually opaque waste water.

Further disadvantages of current suspension arrangements are inconvenience and inflexibility. It is found that the placement of these devices is important for optimum effectiveness, both as to depth of immersion and to horizontal spacing between devices and from the walls of a waste water treatment vessel. Moreover gasification devices in waste water are liable to blockage or obstruction of the gas introduction apertures. It is therefore necessary from time to time to lift the devices out of the waste water for cleaning or replacement. It is then important to restore the cleaned device, or dispose the replacement device, to the original correct location as to depth and spacing. This exact, repeatable, placement of devices in a desired location in opaque waste water poses a problem with current suspension arrangements.

SUMMARY OF THE INVENTION

According to the present invention there is provided a device for the gasification of liquids comprising a hollow annular member bounding a central liquid flow passageway, said member having a gas inlet into said hollow and a plurality of apertures surrounding said passageway to permit introduction of gas from said hollow into liquid flowing in use up through said passageway to form gas bubbles in said liquid, weighting matter associated with said member to give said device an overall density greater than that of a said liquid, and suspension means adapted to enable said device to be suspended in a body of liquid, said suspension means being generally rigid with said member and having an effective suspension point located above said member.

By locating the effective suspension point above the member, the moment of inertia of the device about a horizontal axis passing through the suspension point is greatly increased, thereby reducing the likelihood of the device oscillating to an undesirable extent about that horizontal axis when in use. The effective suspension point is preferably 20 to 40 centimeters above said hollow annular member.

The suspension means preferably has horizontally spaced apart first and second effective suspension points whereby to reduce the likelihood of the device oscillating to an undesirable extent about a vertical axis when in use.

The suspension means preferably comprises a generally horizontal tube or first and second horizontally spaced apart eyes. In use a single suspending line, e.g. a wire, chain or rope passes freely through the tube or the eyes and the wire is secured at two spaced apart points above the surface of the body of liquid. The device may thus be threaded onto a wire above liquid level, dropped in and allowed to find its correct depth by sliding down the wire to the lowest point of the wire loop. Since the effective suspension point is located above the member, the member would thereby tend automatically to level itself.

The suspension means may comprise a band encircling an external waist of the annular member, and a handle generally rigid with the band and extending up and over the member from one point on the band to a point diametrically opposite. The tube or eyes would be secured to or formed integrally with the upper portion of the handle. The handle could also serve as a carrying handle for the device out of water. In this case the handle may also be provided with a clip to stabilize a gas supply hose connected in use to said gas inlet to said hollow. Although generally rigid with the band, the handle may have limited flexibility in a restricted sense further to reduce fretting forces in use.

BRIEF DESCRIPTION OF THE DRAWINGS

An embodiment of the invention will now be described, by way of example, with reference to the accompanying drawings, in which:

FIG. 1 is a front perspective view from above of a gasification device without its suspension means;

FIG. 2 is a vertical section on line X—X of FIG. 1 and including one form of suspension means;

FIG. 3 is a scrap view of modified suspension means; and

FIG. 4 is a scrap view of further modified suspension means.

DESCRIPTION OF PREFERRED EMBODIMENT

Referring to FIGS. 1 and 2 there is shown a gasification device comprising a hollow annular member 10 bounding a central liquid passageway 11. The member has a gas inlet 12 into the hollow 13 and a row of apertures 14 surrounding the passageway 11. The passageway has a lower inlet 15 and an upper outlet 16, and comprises a lower convergent portion 17, an intermediate throat portion 18 and an upper divergent portion 19. The apertures 14 are provided substantially centrally of said throat portion 18. The apertures 14 are preferably provided in a single row, are similar to one another and are regularly spaced. They may be 6 millimeters in diameter. For enhanced gasification the divergent portion 19 may be provided with additional, smaller, apertures as described in British Patent Application Ser. No. 7,901,809 referred to above.

The member 10 is conveniently moulded of plastics material, e.g. polyethylene, and has been designed with ease of moulding as a factor. When the device is ready for installation, e.g. on site, it is partially filled with concrete or other dense weighting material 20 to give said device an average density in air substantially greater than that of water. The weighting medium is preferably a cold castable resin/iron shot mixture which has a density in one commercially available form of about 5,500 kg/m$^3$, which is approximately three times the density of concrete. The overall centre of gravity of the weighted device is thereby significantly lower than if concrete were used as the weighting medium. The member 10 may be approximately 30 centimeters in height and 30 centimeters in diameter, when 20 kg or even less of weighting medium may be sufficient.

The member has a waist 29 defined by a circumferentially extending overhang 31 at the point of maximum diameter of about two-thirds of the height of the member. The outer surface of the member tapers inwardly both above and below the overhange 31 to facilitate moulding in plastics material. The overhang is interrupted at two diametrically opposite rebates 32. The device is provided with suspension means, as shown in FIG. 2, comprising a band 30 encircling and closely fitting the waist 29 so as to engage circumferentially beneath the overhang 31.

A handle 33 is rigid with the band and extends up and over the member from point 34 on the band 30 to point 35 diametrically opposite. The handle 33 comprises two broad strips 36 located at their lower ends in the respective rebates 32. The band 30 and strip 36 are preferably formed of polypropylene and are welded together at points 34 and 35. The upper ends of strip 36 are connected together by a rigid horizontal polypropylene tube 37 providing a horizontally extensive suspension point for the complete device at least 20 centimeters above the top surface of the hollow member 10. The band 30 is a close fit and strips 36 are located in rebate 32, so the suspension means is generally rigid with the member. The strips 36 are also effectively rigid across their width perpendicular to the plane of FIG. 2, but allow a slight flexibility or degree of freedom in the restricted horizontal direction in the plane of FIG. 2.

In use a single suspending line, preferably a plastics covered wire 38 is passed freely through the tube 37. The device may thus be threaded onto wire 38 above water level at the side of the treatment vessel, dropped in and allowed to slide down the wire 38 to the lowest point of the wire loop. The wire will previously have been measured so that the device finds its correct depth in the waste water and will automatically level itself due to its high moment of inertia about the handle tube 37. The two runs of wire suitably diverge at 45° to 60° to reduce the likelihood of angular oscillation about a vertical axis. For the same reason the tube should preferably be at least 10 centimeters in length, e.g. 15 centimeters. For retrieval of the device for inspection or replacement either the wire may be hauled up or a further line attached to the device to enable the device to be pulled along and up the suspending wire.

The upper part of the upper divergent portion 19 is recessed at 40 over a limited arc. A threaded gas inlet 12 into the hollow is provided in the base of the recess 40. In use a hose adaptor is received in the inlet 12 and is connected to a flexible gas supply hose 42. The positioning of the gas inlet in the recess 40 protects the hose union from accidental knocks. The handle strip 36 may be provided with a clip 43 to stabilize the gas supply hose adjacent the hose union.

FIG. 3 shows a modified handle arrangement. In this form strips 36' (similar to strips 36) are secured to opposite side walls of a rigid tube 37' (similar to tube 37). FIG. 4 shows a further modified arrangement in which a single handle strip 36" loops over the member from side to side and a rigid tube 37" (similar to tube 37) is secured to the top centre underside of the strip 36". In a further unillustrated embodiment the tube 37 may be replaced by two horizontally spaced apart suspension eyes to provide a similar technical effect. In each of these modified arrangements the device provides the same technical features as the arrangement of FIGS. 1 and 2: namely the effective suspension point is above the member 10, the effective suspension point is horizontally extended, the centre of gravity is low, and the device can be slid down a suspending wire automatically to level itself and to find its desired depth. The consequences and advantages of these features are fully explained hereinabove.

I claim:

1. In apparatus for the treatment of liquids by gasification, a gasification device and flexible suspending means for freely suspending said device in a body of liquid to be gasified; said device comprising a hollow annular member bounding a central liquid flow passageway, said member having a gas inlet into said hollow and a plurality of apertures surrounding said passageway to permit introduction of gas from said hollow into liquid flowing in use up through said passageway to form gas bubbles in said liquid, weighting matter associated with said member to give said device an overall density greater than that of said liquid, and suspension means generally rigid with said member and defining an effective suspension point located above said hollow annular member; said annular member having an external waist, and said suspension means comprising a band encircling said external waist and a handle generally rigid with said band and extending up and over the member from one point of said band to a point diametrically opposite; and said flexible suspending means constituting the sole means for freely suspending said device at a predetermined depth within said body of liquid and comprising a flexible suspending line passing through said effective suspension point of said gasification device.

2. Apparatus according to claim 1 wherein said suspension means is adapted for free sliding reception of said flexible suspending line through said effective suspension point.

3. Apparatus according to claim 2 wherein said suspension means comprises a generally horizontal tube, and wherein said suspending line passes freely through said generally horizontal tube.

4. Apparatus according to claim 1 wherein said suspension means provides horizontally spaced apart first and second effective suspension points.

5. Apparatus according to claim 1 wherein a circumferential overhang is formed on the member adjacent said waist, and said band engages circumferentially beneath said overhang.

6. Apparatus according to claim 1 wherein said handle has limited flexibility in a restricted sense.

7. Apparatus according to claim 1 wherein said handle is provided with a clip adapted for supporting connection to a gas supply hose to said gas inlet.

8. Apparatus according to claim 1 wherein said effective suspension point is substantially as far above the top surface of the member as the height of the member itself.

* * * * *